United States Patent Office 3,483,226
Patented Dec. 9, 1969

3,483,226
16-OXA AND 17-OXA-D-HOMOESTRA-1,3,5(10)-TRIEN-3-OLS AND D-NOR-SECO-DIOLS CORRESPONDING, ETHERS AND ESTERS THEREOF
John S. Baran, Morton Grove, Ill., assignor to G. D. Searle & Co., Chicago, Ill., a corporation of Delaware
No Drawing. Continuation-in-part of application Ser. No. 359,473, Apr. 13, 1964. This application June 12, 1967, Ser. No. 645,474
Int. Cl. C07d 5/32, 101/00; A61k 17/06
U.S. Cl. 260—345.2       6 Claims

ABSTRACT OF THE DISCLOSURE 16-oxa and 17-oxa-D-homoestra-1,3,5(10)-trien-3-ols and D-nor-seco-diols corresponding useful as pharmacological agents, as evidenced by their hypocholesterolemic and estrogenic properties, and manufactured by reduction of the corresponding 16-oxa-17-oxo and 17-oxa-D-homo-17a-oxo lactones followed by cyclization of the resulting 15,16- and 16,17-seco-diols.

---

This application is a continuation-in-part of my copending application Ser. No. 359,473, filed Apr. 13, 1964, now abandoned, which is a continuation-in-part of my copending application Ser. No. 302,011, filed Aug. 14, 1963, and now abandoned.

The present invention is concerned with novel steroidal ethers and the corresponding seco-diols and, more particularly, with 16-oxa and 17-oxa-D-homoestra-1,3,5(10)-trien-3-ols, D-nor-seco-diols corresponding, and the ethers and esters thereof represented by the following structural formulas

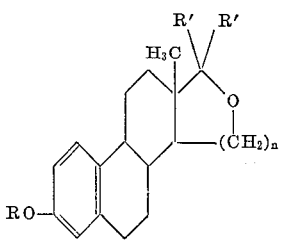

and

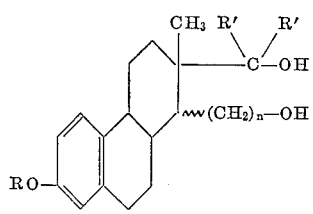

wherein R is hydrogen or a lower alkyl or lower alkanoyl radical, R' is hydrogen or a lower alkyl radical and $n$ is a positive integer less than 3.

Examples of the lower alkyl radicals encompassed by R and R' are methyl, ethyl, propyl, butyl, pentyl, hexyl, heptyl, and the branched-chain radicals isomeric therewith.

The lower alkanoyl radicals embraced by the R term are typified by acetyl, propionyl, butyryl, valeryl, caproyl, heptanoyl, and the corresponding branched-chain radicals.

Starting materials suitable for the manufacture of the instant compounds are the D-ring lactones represented by the following structural formula

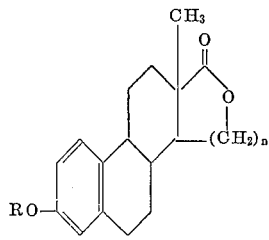

wherein R and $n$ are as herein before defined. Manufacture of those starting materials is described in U.S. Patent 3,312,717, issued Apr. 4, 1967. Reduction of those starting materials results in the instant novel seco-diols represented by the following structural formula

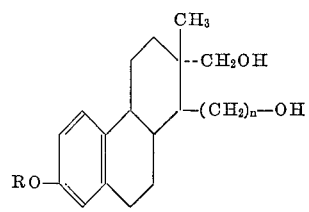

As a specific example of the manufacture of a seco-diol of that structure, there is mentioned the reaction of 3-methoxy-16-oxaestra - 1,3,5(10)-trien-17-one with lithium aluminum hydride in tetrahydrofuran to afford 15,16-seco-D-norestra-1,3,5(10)-triene - 3,15,16-triol 3-methyl ether. In a similar manner, 3-methoxy-17-oxa-D-homoestra-1,3,5(10)-trien-17a-one is converted to 16,17-seco-estra-1,3,5(10)-trien-3,16,17-triol 3-methyl ether. The latter reduction can be conducted with reducing reagents generally useful in the conversion of lactones or esters to alcohols. Examples of alternative useful methods are the utilization of diisobutyl aluminum hydride, sodium borohydride, potassium borohydride, sodium and ethano, and catylytic hydrogenation, in which the preferred catalyst is copper chromium oxide.

Dehydration of the latter seco-diols affords the novel ethers of the present invention. Acidic dehydrating agents are particularly suitable in this process. Specific examples are methanesulfonyl chloride, p-toluenesulfonic acid, p-toluenesulfonyl chloride and thionyl chloride. Illustrative of this dehydration method is the reaction of 16,17-seco-estra - 1,3,5(10)-triene-3,16,17-triol 3-methyl ether with p-toluenesulfonic acid in benzene at the reflux temperature to produce 17-oxa-D-homoestra-1,3,5(10)-trien-3-ol 3-methyl ether. An alternate process is exemplified by the room temperature reaction of 15,16-seco-D-norestra-1,3,5(10)-triene-3,15,16-triol 3-methyl ether with methanesufonyl chloride in the presence of pyridine to yield 16-oxaestra-1,3,5(10)-trien-3-ol 3-methyl ether.

When the aforementioned lactone starting materials are allowed to react with the appropriate alkyl organometallic reagent, the instant 2-(1-alkylated) seco-diols are produced. Typically, 3-methoxy - 16 - oxaestra-1,3,5(10)-trien-17-one is contacted with methyl magnesium bromide in an anisole-diisobutyl ether mixture to afford 15,-16 - seco-16,16-dimethyl-D-norestra - 1,3,5(10)-triene-3,-15,16-triol 3-methyl ether. Dehydration of these diols by the method described hereinbefore affords the corresponding 17,17- or 17a,17a-D-homo-dialkyl ethers. The aforementioned 15,16-seco-16,16-dimethyl-D-nor-estra-1,3,5(10)-triene-3,15,16-triol 3-methyl ether, for example, is contacted with p-toluenesulfonyl chloride in pyridine to yield 17,17-dimethyl-16-oxaestra-1,3,5(10)-trien-3-old 3-methyl ether.

The 14β-seco-diols and 14β-ethers of the present invention are obtained by a series of steps involving oxidation of the aforementioned seco-diols to the corresponding 15-oxo lactones, epimerization to afford the 14β-lactones, reduction to yield the 14β-seco-diols and dehydration to produce the corresponding 14β-ethers. These processes are exemplified by the reaction of 15,16-seco-D-norestra-1,3,5(10)-triene-3,15,16-triol 3-methyl ether with aqueous chromic acid to produce 3-methoxy-16-oxaestra-1,3,5 (10)-trien-15-one, epimerization of that lactone by heating in tertiary-butyl alcohol with potassium tertiary-butoxide to afford 3-methoxy-16-oxa-14β-estra-1,3,5(10)-trien-15-one.

The compounds of this invention display valuable pharmacological properties. They are, for example, hypocholesterolemic agents as is evidenced by their ability to reduce serum cholesterol levels. In addition, they exhibit estrogenic activity. These substances can be administered in any of a number of conventional pharmaceutical forms and also by conventional routes. For oral administration suitable solid forms are pills, powders, capsules, tablets, and the like, and suitable liquid forms are syrups, emulsions, elixirs, suspensions, and the like. For parenteral administration these compounds can be dispersed in an aqueous suspension or dissolved in a pharmacologically acceptable oil or oil-water emulsion. Suitable excipients can also be added.

The pharmacological activity of the novel compounds of this invention is specifically illustrated by the hypocholesterolemic response produced in adult male rats to which was administered orally on each of 10 successive days, 10 mg./kg. 17-oxa-D-homoestra-1,3,5(10)-trien-3-ol 3-methyl ether, 15,16-seco-D-norestra-1,3,5 (10)-triene-3,15,16-triol 3-methyl ether or 15,16-seco-16,16-dimethyl-D-norestra-1,3,5(10)-triene-3,15,16-triol 3-methyl ether. The reduction in plasma cholesterol concentration, as determined by the assay of Ranney et. al., J. Pharm. Exptl. Therap., 142, 132 (1963), were 16.4%, 30.7% and 20.4%.

The estrogenic activity of these compounds is illustrated by the uterotrophic effect produced in immature female mice to whom had been subcutaneously administered corn oil solutions of 16-oxaestra-1,3,5(10)-trien-3-ol 3-methyl ether or 15,16-seco-D-norestra-1,3,5(10)-triene-3,15,16-triol 3-methyl ether over a period of 3 days at total doses varying between 0.3 and 1.0 mg. per mouse. In the assay of Edgren, Proc. Soc. Exp. Biol. and Med. 92, 569, (1956) those compounds exhibit potencies, as compared to the standard, i.e. subcutaneously administered estrone, of 0.05% and 0.03%, respectively.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples, temperatures are given in degrees centigrade (° C.). Quantities of materials are expressed in parts by weight unless otherwise noted.

EXAMPLE 1

Into a solution of 9.3 parts of 17-acetoxyestra-1,3,5 (10), 16-tetraen-3-ol 3-methyl ether in 147 parts of methylene chloride, at about −70°, is passed a stream of oxygen containing 6% of ozone until one molecular equivalent of ozone is absorbed. To that reaction mixture is then added successively 2 parts of zinc and 42 parts of acetic acid, and the resulting mixture is stirred after the cooling bath is removed. An exothermic reaction ensues causing the temperature to rise to the reflux point, at which time heating is continued on the steam bath for about 15 minutes while the methylene chloride is removed by distillation. The residual mixture is diluted with about 300 parts of chloroform, then is filtered, and the filtrate is washed successively with water, dilute hydrochloric acid and water. Distillation of the solvent at reduced pressure affords a residue which is dissolved in 30 parts of pyridine. To that pyridine solution is added a solution of 4 parts of potassium carbonate in 50 parts of water, and the resulting mixture is heated at about 90° for about 45 minutes, then is cooled to room temperature and poured carefully into a mixture of ice and excess dilute hydrochloric acid. The precipitate which forms is collected by filtration washed on the filter with water, and dried in vacuo to afford 3-methoxy-16,17-seco-16-oxoestra-1,3,5(10)-trien-17-oic-acid melting at about 146–150°. Recrystallization of this crude product from a mixture of ether and hexane affords the pure material, characterized by a melting point of 155° and an optical rotation of +79° in chloroform. Infrared absorption maxima are observed at about 3.41, 3.67, 5.79, 5.88, 6.21, 7.79, and 9.62 microns.

A mixture of 1.2 parts of 3-methoxy-16,17-seco-16-oxoestra-1,3,5(10)-trien-17-oic acid and 1.2 parts of p-toluenesulfonic acid monohydrate in 440 parts of benzene is distilled over a period of about 2 hours, during which time approximately 220 parts of benzene is collected. The reaction mixture is cooled to room temperature, then is washed with saturated aqueous sodium bibarbonate, dried over anhydrous magnesium sulfate, and concentrated to dryness at reduced pressure. The residue which remains is triturated with ether to afford 3-methoxy-17-oxa-D-homoestra-1,3,5(10), 15-tetraen-17a-one, which melts at about 139–149°. Decolorization by means of activated carbon and recrystallization from acetone results in the pure material, characterized by a melting point of about 155–158° and an optical rotation of −109° in chloroform. This compound displays infrared absorption peaks at about 3.38, 5.63, 6.02, 6.18, 8.58, 9.20 and 9.76 microns.

Into a solution of 6 parts of 3-methoxy-17-oxa-D-homoestra-1,3,5(10), 15-tetraen-17a-one in 94 parts of methylene chloride, at −70°, is passed a stream of oxygen containing 6% of ozone. After approximately one molecular equivalent of ozone has been absorbed, the solution is flushed by means of a stream of nitrogen in order to remove excess oxidant, and 6 parts of zinc followed by 21 parts of acetic acid is added. This mixture is stirred at room temperature for about 45 minutes, then is concentrated to a small volume by distillation, and is diluted with about 600 parts of chloroform. The resulting mixture is filtered, and the filtrate is washed successively with water, dilute hydrochloric acid, and water. Distillation of this organic solution to dryness under reduced pressure affords a residue which is dissolved in 25 parts of pyridine. To that pyridine solution is added a solution of 6 parts of potassium carbonate in 100 parts of water, and that mixture is heated at about 90° for about 45 minutes, then is cooled to room temperature and is added gradually with stirring to a mixture of ice and excess dilute hydrochloric acid. The resulting precipitated solid is collected by filtration, washed with water on the filter and dried, resulting in 3-methoxy-15,16-seco-15-oxo-D-norestra-1,3,5(10)-trien-17-oic acid, melting at about 174–176°. Two successive recrystallizations from etheracetone produce a sample of the pure material, melting at about 191–193° and characterized further by infrared absorption peaks at about 3.39, 3.63, 5.79, 5.84, 6.21, 7.75, 8.89, and 9.62 microns.

To a solution of one part of sodium borohydride in 50 parts of ethanol is added slowly, with stirring 1.05 parts of 3-methoxy-15,16-seco-15-oxo-D-norestra-1,3,5(10)-trien-17-oic acid and the reaction mixture is diluted with water after the initial reaction subsides. The resulting solution is stirred at room temperature for about 45 minutes, then is made acidic by the addition of dilute hydrochloride acid, and is finally diluted with water to effect crystallization of the product. These crystals are collected by filtration, then washed on the filter with water and dried to produce 3-methoxy-15,16-seco-15-hydroxy-D-norestra-1,3,5(10)-trien-17-oic acid, which melts at about 154–159° with evolution of a gas. Further purification is effected by recrystallization from acetone-hexane, resulting in the pure material, melting at about 163–165°, accompanied by evolution of a gas. This substance is further characterized by an optical rotation of +63.5° in chloroform and also by infrared absorption maxima at about 3.0–4.0, 3.4, 5.96, 6.2, 8.59, and 9.3 microns.

A mixture of one part of 3-methoxy-15,16-seco-15-hydroxy-D-norestra-1,3,5(10)-trien-17-oic acid, 0.01 part of p-toluenesulfonic acid monohydrate and 264 parts of benzene is distilled until approximately 88 parts of benzene is collected. The reaction mixture is then cooled to room temperature and is washed with dilute aqueous sodium bicarbonate, then is dried over anhydrous magnesium sulfate, and concentrated to dryness at reduced pressure to afford crystals of 3-methoxy-16-oxaestra-1,3,5(10)-trien-17-one, melting at about 163–165°. Crystallization of that material from acetone has no effect upon the melting point. This substance is characterized also by infrared absorption maxima at about 3.4, 5.62, 6.22, 9.26, and 10.12 microns.

EXAMPLE 2

To a slurry of one part of lithium aluminum hydride with 67 parts of tetrahydrofuran is added dropwise, with stirring, a solution of 5 parts of 3-methoxy-16-oxa-estra-1,3,5(10)-trien-17-one in 90 parts of tetrahydrofuran. After that reaction mixture has been stirred for about one hour, 140 parts of ether is added. To the resulting organic solution is then added carefully 10 parts by volume of 90% aqueous tetrahydrofuran followed by 0.75 part by volume of 20% aqueous sodium hydroxide and 3.6 parts of water. The resulting precipitated salts are separated by filtration, and the filtrate is evaporated to dryness under reduced pressure to afford the crude product, melting at about 139–141°. Crystallization of that material from a mixture of acetone and hexane affords pure 15,16-seco-D-norestra-1,3,5(10)-triene - 3,15,16 - triol 3-methyl ether, melting at about 141–142° and characterized also by an optical rotation of +17° in chloroform. Infrared absorption peaks are observed at about 2.73, 2.92, 3.41, 6.22, 8.60, 9.63, and 9.99 microns. This substance can be represented by the following structural formula

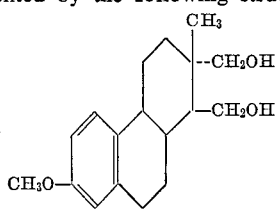

EXAMPLE 3

A solution containing 2.9 parts of 15,16-seco-D-norestra-1,3,5(10)-triene-3,15,16-triol 3 - methyl ether, 1.2 parts of methanesulfonyl chloride, and 20 parts of anhydrous pyridine is allowed to stand at room temperature for about 16 hours, then is diluted with water and extracted with methylene chloride. The organic layer is separated, washed successively with dilute hydrochloric acid, water, and saturated aqueous sodium bicarbonate, then dried over anhydrous magnesium sulfate and distilled to dryness under reduced pressure. The remaining residue is dissolved in approximately 26 parts of toluene, and that solution is stirred at the reflux temperature with 0.55 part of sodium hydride. The addition of a small quantity of methanol destroys the excess sodium hydride, and that mixture is then stirred with approximately one part of water, dried over anhydrous sodium sulfate, and evaporated to dryness under reduced pressure. Trituration of the resulting residue with methanol affords crystals of pure 16-oxaestra-1,3,5(10)-trien-3-ol 3-methyl ether, melting at about 88–90°, and characterized further by infrared absorption maxima (potassium bromide disc) at about 6.21, 7.95, 8.85, 9.18, 9.37, and 11.30 microns. It is represented by the following structural formula

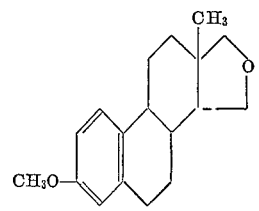

EXAMPLE 4

To a solution of 1.7 parts of 15,16-seco-D-norestra-1,3,5(10)-triene-3,15,16-triol 3-methyl ether in 80 parts of acetone is added, at 0–5° with stirring, 3.3 parts by volume of an aqueous solution, 8 N in chromium trioxide and 8 N in sulfuric acid. After a few minutes, 1.6 parts of isopropyl alcohol followed by approximately 400 parts of water is added with vigorous stirring. The resulting precipitated crude product is collected by filtration, washed on the filter with water and dried at reduced pressure. Recrystallization from acetone-hexane affords pure 3-methoxy-16-oxaestra-1,3,5(10)-trien-15-one, melting at about 137–138°. It displays an optical rotation of +25.5° in chloroform.

EXAMPLE 5

A mixture of 2 parts of 3-methoxy-16-oxaestra-1,3,5(10)-trien-15-one, 2 parts of potassium tertiary-butoxide, and 160 parts of tertiary-butyl alcohol is heated at the reflux temperature, with stirring, for about one hour, then is cooled and made acidic by the addition of dilute hydrochloric acid. Evaporation of the acidic solution to dryness under reduced pressure affords a residue, which is triturated with water. The resulting solid is collected by filtration, washed on the filter with water, and dried to yield the crude product, melting at about 138–144°. Successive recrystallizations from methanol-methylene chloride and methanol afford pure 3-methoxy-16-oxa-14β-estra-1,3,5(10)-trien-15-one, melting at about 154–155°. It is characterized further by an optical rotation of +200° in chloroform.

EXAMPLE 6

To a solution of 0.2 part of lithium aluminum hydride in 14 parts of tetrahydrofuran is added dropwise with stirring a solution of one part of 3-methoxy-16-oxa-14β-estra-1,3,5(10)-trien-15-one in 20 parts of tetrahydrofuran. That reaction mixture is stirred at room temperature for about one hour, then is diluted with ether. Approximately 2 parts of 90% aqueous tetrahydrofuran followed by 0.15 part by volume of 20% aqueous sodium hydroxide and 0.7 part of water are successively added, and the resulting precipitated salts are removed by filtration. Distillation of the filtrate to dryness under reduced pressure affords the crystalline crude product, which is recrystallized from acetone-hexane to afford crystals of pure 15,16-seco-D-nor-14β-estra-1,3,5(10)-triene-3,15,16-triol 3-methyl ether, melting at about 172–175°. In a potassium bromide disc, it displays infrared absorption maxima at about 2.98, 3.41, 6.20, and 6.35 microns and can be represented by the following structural formula

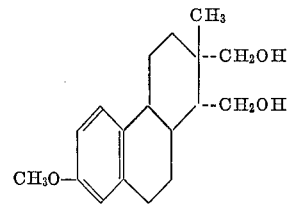

EXAMPLE 7

To a solution of one part of sodium borohydride in 50 parts of ethanol is added portionwise, with stirring, 1.1 parts of 3-methoxy-16,17-seco-16-oxoestra-1,3,5(10)-trien-17-oic acid and this reaction mixture is diluted with water after the initial reaction has subsided. Stirring of this mixture at room temperature is continued for about one hour, after which time it is acidified by means of dilute hydrochloric acid. The acidic mixture is diluted further with water, resulting in precipitation of the crude product. This solid material is collected by filtration and dried to afford 3-methoxy-17-oxa-D-homoestra-1,3,5(10)-trien-17a-one, melting at about 163–164° and characterized also by an optical rotation of +86.5° in chloroform. This substance displays infrared absorption maxima at about 3.39, 5.80, 6.22, 7.80, 8.65, 8.89, 9.03, 9.38, and 9.57 microns.

EXAMPLE 8

The reduction of 5.2 parts of 3-methoxy-17-oxa-D-homoestra-1,3,5(10)-trien-17a-one with lithium aluminum hydride according to the procedure described in Example 2 results in 16,17-secoestra-1,3,5(10)-triene-3,16,17-triol 3-methyl ether, melting at about 140–141° and displaying an optical rotation of +104° in chloroform. It is characterized further by the following structural formula

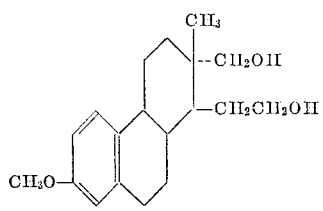

EXAMPLE 9

A solution containing 4 parts of 16,17-secoestra-1,3,5(10)-triene-3,16,17-triol 3-methyl ether, 2 parts of p-toluenesulfonic acid monohydrate, and 8800 parts of benzene is slowly distilled over a period of about one hour, during which time the volume is decreased to about one-half. The cooled solution is then washed with saturated aqueous sodium bicarbonate, dried over anhydrous magnesium sulfate, and evaporated to dryness at reduced pressure. Trituration of the residue with methanol affords crystals which are collected by filtration, washed on the filter with methanol, and dried to afford the crude product melting at about 90–94°. This crude product is dissolved in benzene, and the benzene solution is chromatographed on a silica gel column. Elution with 2% ethyl acetate in benzene affords a fraction, which is recrystallized from ether-methanol to yield pure 17-oxa-D-homoestra-1,3,5(10)-trien-3-ol 3-methyl ether, which melts at about 83–84° and displays an optical rotation of +102° in chloroform. This substance can be represented by the following structural formula

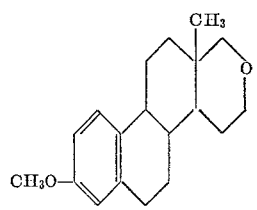

EXAMPLE 10

To a solution of 2 parts of 3-methoxy-16-oxaestra-1,3,5(10)-trien-17-one in 20 parts of anisole is added, with stirring, 5 parts by volume of a 3 molar methyl magnesium bromide solution in dibutyl ether. Stirring at room temperature is continued for about 40 minutes, after which time the reaction mixture is diluted successively with 8 parts of methanol and 1000 parts of water. The resulting aqueous mixture is extracted with chloroform, and the organic layer is separated, dried over anhydrous magnesium sulfate, and concentrated to dryness. Trituration of the residue with a mixture of ether and hexane affords 15,16-seco-16,16-dimethyl-D-norestra - 1,3,5(10)-triene-3,15,16-triol 3-methyl ether, melting at about 160–164°. Recrystallization of this crude product from ether affords a pure sample, melting at about 166–168° and characterized further by an optical rotation of −9° in chloroform and also by infrared absorption maxima at about 2.99, 3.42, 6.23, 7.82, 8.32, and 9.65 microns. It is characterized also by the following structural formula

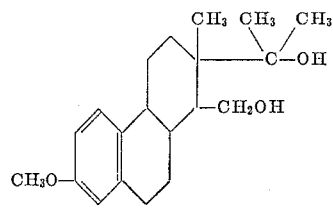

EXAMPLE 11

To a solution of 2.8 parts of 15,16-seco-16,16-dimethyl-D-norestra-1,3,5(10)-triene-3,15,16-triol 3-methyl ether in 10 parts of pyridine is added 2.3 parts of p-toluenesulfonyl chloride, and the resulting reaction mixture is kept at room temperature for about 20 hours, then is diluted with water. The resulting aqueous mixture is extracted with benzene, and the benzene layer is separated, washed successively with dilute hydrochloric acid, water, and aqueous sodium bicarbonate, dried over anhydrous magnesium sulfate and distilled to dryness at reduced pressure. The residual oily material is dissolved in benzene and the organic solution is chromatographed on a silica gel column. The 2% ethyl acetate in benzene eluate affords a fraction which is recrystallized from methanol, resulting in pure 17,17-dimethyl-16-oxaestra-1,3,5(10)-trien-3-ol 3-methyl ether, melting at about 60–61°. It displays an optical rotation of +18° in chloroform and is characterized further by the following structural formula

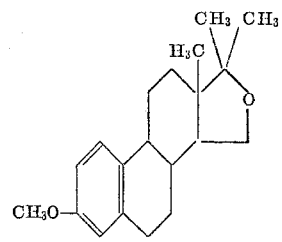

EXAMPLE 12

The substitution of 2.1 parts of 3-methoxy-17-oxa-D-homostra-1,3,5(10)-trien-17a-one in the procedure of Example 10 results in 16,17 - seco - 17,17 - dimethylestra-1,3,5(10)-triene-3,16,17-triol 3-methyl ether, which after recrystallization from ether, melts at about 126–127°. This compound can be represented by the structural formula

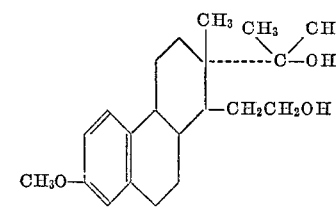

EXAMPLE 13

A solution containing 2.8 parts of 16,17-seco-17,17-dimethylestra-1,3,5(10) - triene - 3,16,17 - triol 3 - methyl ether, 5.6 parts of p-toluenesulfonyl chloride, and 100 parts of pyridine is stored at room temperature for about 24 hours, then is diluted with a mixture of ice and water. The resulting precipitated crystals are collected by filtration, washed on the filter with water, and dried to yield pure 17a,17a-dimethyl-17-oxa-D - homoestra - 1,3,5(10)- trien-3-ol 3-methyl ether, melting at about 117–118°. It is characterized further by the following structural formula

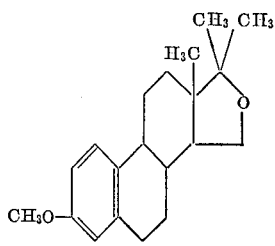

EXAMPLE 14

By substituting an equivalent quantity of 17-acetoxy-estra-1,3,5(10), 16-tetraen-3-ol 3-ethyl ether and otherwise proceeding according to the successive processes described in Example 1, 3-ethoxy-16-oxaestra-1,3,5(10)-trien-17-one is obtained.

The substitution of an equivalent quantity of 3-ethoxy-16-oxaestra-1,3,5(10)-trien-17-one in the procedure of Example 2 results in 15,16-seco-D - norestra - 1,3,5(10)-triene-3,15,16-triol 3-ethyl ether.

EXAMPLE 15

The reduction of an equivalent quantity of 3-ethoxy-16,17-seco-16-oxoestra-1,3,5(10)-trien-17-oic acid by the procedure of Example 7 affords 3-ethoxy-17-oxa-D-homo-estra-1,3,5(10)-trien-17a-one.

When an equivalent quantity of 3-ethoxy-17-oxa-D-homoestra-1,3,5(10)-trien-17a-one is substituted in the procedure of Example 8, 16,17-secoestra-1,3,5(10)-triene-3,16,17-triol 3-ethyl ether is produced.

EXAMPLE 16

A mixture of 1.5 parts of 3-methoxy-16-oxaestra-1,3,5(10)-trien-17-one, 7 parts of potassium hydroxide, and 40 parts by volume of 95% ethanol is heated at about 200° for about 23 hours in a closed vessel, then is cooled to room temperature and acidified by the addition of dilute hydrochloric acid. This acidic mixture is then diluted with water to about 800 parts by volume, and the organic solvent is removed by distillation. Cooling of that aqueous mixture to about 5° results in crystallization of the product, which is collected by filtration, washed on the filter with water, and dried under reduced pressure. The resulting crude product is 3-hydroxy-16-oxaestra-1,3,5(10)-trien-17-one, melting at about 260–270°. Purification by crystallization from acetone affords a pure sample, melting at about 284–285° and characterized further by an optical rotation of +59.5° in pyridine and also by infrared absorption maxima at about 2.95, 3.40, 5.72, 6.21, 6.23, 8.18, 9.15, 10.24, and 11.42 microns (potassium bromide).

The substitution of an equivalent quantity of 3-hydroxy-16-oxaestra-1,3,5(10)-trien-17-one in the procedure of Example 2 affords 15,16-seco-D-norestra-1,3,5(10)-triene-3,15,16-triol.

EXAMPLE 17

By substituting 1.57 parts of 3-methoxy-17-oxa-D-homoestra-1,3,5(10)-trien-17a-one and otherwise proceeding according to the processes described in Example 16, 3 - hydroxy-17-oxa-D-homoestra-1,3,5(10)-trien-17a-one, melting at about 275–278° is obtained. Recrystallization of this crude product from acetone affords a pure sample, melting at about 279–280° and displaying an optical rotation of +85° in pyridine. Infrared absorption maxima are observed at about 3.01, 3.39, 5.88, 6.21, 7.92, 8.60, 9.40, and 11.45 microns (potassium bromide).

When an equivalent quantity of 3-hydroxy-17-oxa-D-homoestra-1,3,5(10)-trien-17a-one is substituted in the procedure of Example 2, 16,17-secoestra-1,3,5(10)-triene-3,16,17-triol is obtained.

EXAMPLE 18

A solution containing 2.76 parts of 15,16-seco-D-norestra-1,3,5(10)-triene-3,15,16-triol, 1.02 parts of acetic anhydride and 25 parts of pyridine is heated at 90–100° for about one hour, then is stored at room temperature for about 16 hours. Careful dilution of the reaction mixture with water affords a crystalline precipitate, which is collected by filtration and dried to afford 15,16-seco-D-norestra-1,3,5(10)-triene-3,15,16-triol 3-acetate.

EXAMPLE 19

The acylation of 2.9 parts of 16,17-secoestra-1,3,5(10)-triene-3,16,17-triol with 1.3 parts of propionic anhydride in the presence of 20 parts of pyridine according to the procedure described in Example 18 affords 16,17-secoestra-1,3,5(10)-triene-3,16,17-triol 3-propionate.

EXAMPLE 20

When an equivalent quantity of ethyl magnesium bromide is substituted in the procedure of Example 10, 15,16-seco - 16,16 - diethyl-D-norestra-1,3,5(10)-triene-3,15,16-triol 3-methyl ether is obtained.

EXAMPLE 21

The substitution of an equivalent quantity of 15,16-seco-D-norestra-1,3,5(10)-triene - 3,15,16 - triol 3-ethyl ether in the procedure of Example 3 results in 16-oxaestra-1,3,5(10)-triene-3-ol 3-ethyl ether.

EXAMPLE 22

By substituting an equivalent quantity of 16,17-secoestra-1,3,5(10)-triene-3,16,17-triol 3-ethyl ether and otherwise proceeding according to the processes described in Example 9, 17-oxa-D-homoestra-1,3,5(10)-trien-3-ol 3-ethyl ether is obtained.

EXAMPLE 23

The substitution of an equivalent quantity of 15,16-seco-D-norestra-1,3,5(10)-triene-3,15,16-triol in the procedure of Example 9 affords 16-oxaestra-1,3,5(10)-trien-3-ol.

EXAMPLE 24

When an equivalent quantity of 16,17-secoestra-1,3,5(10)-triene-3,16,17-triol is substituted in the procedure of Example 9, 17-oxa-D-homoestra-1,3,5(10)-trien-3-ol is obtained.

EXAMPLE 25

The substitution of an equivalent quantity of 15,16-seco-D-norestra-1,3,5(10)-triene-3,15,16 - triol 3-acetate in the procedure of Example 3 results in 16-oxaestra-1,3,5(10)-trien-3-ol 3-acetate.

EXAMPLE 26

By substituting an equivalent quantity of 16,17-secoestra-1,3,5(10) - triene - 3,16,17-triol 3-propionate and otherwise proceeding according to the processes described in Example 9, 17-oxa-D-homoestra-1,3,5(10)-trien-3-ol 3-propionate is obtained.

EXAMPLE 27

When an equivalent quantity of 15,16-seco-16,16-diethyl-D-norestra - 1,3,5(10) - triene - 3,15,16 - triol 3-methyl ether is substituted in the procedure of Example 11, 17,17-diethyl - 16 - oxaestra - 1,3,5(10)-trien-3-ol 3-methyl ether is obtained.

EXAMPLE 28

The substitution of an equivalent quantity of 15,16-seco-D-nor-14β-estra-1,3,5(10) - trien - 3,15,16 - triol 3-methyl ether in the procedure of Example 3 results in 16-oxa-14β-estra-1,3,5(10)-trien-3-ol 3-methyl ether.

EXAMPLE 29

The acylation of one part of 16-oxaestra-1,3,5(10)-trien-3-ol with 10 parts of acetic anhydride and 20 parts of pyridine according to the procedure of Example 18 results in 16-oxaestra-1,3,5(10)-trien-3-ol 3-acetate, identical with the product of Example 25.

EXAMPLE 30

When 2 parts of 17-oxa-D-homoestra-1,3,5(10)-trien-3-ol is acylated with 26 parts of propionic anhydride and 40 parts of pyridine of pyridine by the processes described in Example 18, 17-oxa-D-homoestra-1,3,5(10)-trien-3-ol 3-propionate, identical with the product of Example 26, is produced.

What is claimed is:

1. A compound of the formula

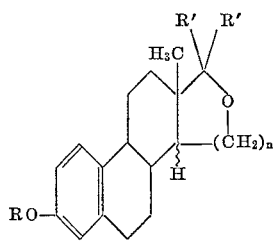

wherein R is selected from the group consisting of hydrogen and radicals of the class consisting of lower alkyl and lower alkanoyl, R' is a member of the class consisting of hydrogen and lower alkyl radicals, and $n$ is a positive integer less than 3.

2. As in claim 1, a compound of the formula

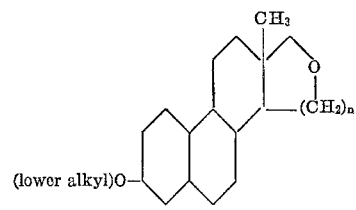

wherein $n$ is a positive integer less than 3.

3. As in claim 1, the compound which is 16-oxaestra-1,3,5(10)-trien-3-ol 3-methyl ether.

4. As in claim 1, the compound which is 17-oxa-D-homoestra-1,3,5(10)-trien-3-ol 3-methyl ether.

5. As in claim 1, the compound which is 17,17-dimethyl-16-oxaestra-1,3,5(10)-trien-3-ol 3-methyl ether.

6. As in claim 1, the compound which is 17a,-17a-dimethyl-17-oxa - D - homoestra-1,3,5(10)-trien-3-ol 3-methyl ether.

References Cited

UNITED STATES PATENTS

| | | | |
|---|---|---|---|
| 3,099,597 | 7/1963 | Chupp et al. | 260—961 |
| 3,151,146 | 9/1964 | Schrader et al. | 260—961 |
| 3,288,811 | 11/1966 | Krakower et al. | 260—345.2 |
| 3,294,819 | 12/1966 | Krakower et al. | 260—345.2 XR |

HENRY R. JILES, Primary Examiner

J. M. FORD, Assistant Examiner

U.S. Cl. X.R.

260—346.2, 488, 613, 619, 999